US009129783B2

(12) United States Patent
Brown et al.

(10) Patent No.: US 9,129,783 B2
(45) Date of Patent: Sep. 8, 2015

(54) MS/MS ANALYSIS USING ECD OR ETD FRAGMENTATION

(71) Applicants: Micromass UK Limited, Wilmslow (GB); The University of British Columbia, Vancouver (CA)

(72) Inventors: Jeffery Mark Brown, Hyde (GB); Damon Robb, Vancouver (CA)

(73) Assignees: Micromass UK Limited, Wilmslow (GB); The University of British Columbia, Vancouver, BC ( * ) Notice: Subject to any disclaimer, the term of this patent is extended or adjusted under 35 U.S.C. 154(b) by 0 days.

(21) Appl. No.: 14/390,451

(22) PCT Filed: Apr. 5, 2013

(86) PCT No.: PCT/GB2013/050894
§ 371 (c)(1),
(2) Date: Oct. 3, 2014

(87) PCT Pub. No.: WO2013/150315
PCT Pub. Date: Oct. 10, 2013

(65) Prior Publication Data

US 2015/0060657 A1 Mar. 5, 2015

(30) Foreign Application Priority Data

Apr. 5, 2012 (GB) .................................. 1206309.5
Oct. 16, 2012 (GB) .................................. 1218517.9

(51) Int. Cl.
*B01D 59/44* (2006.01)
*H01J 49/28* (2006.01)
*H01J 49/00* (2006.01)

(52) U.S. Cl.
CPC ......... *H01J 49/0054* (2013.01); *H01J 49/0031* (2013.01); *H01J 49/0072* (2013.01)

(58) Field of Classification Search
USPC ......... 250/281–283, 287, 288, 291–293, 296, 250/298
See application file for complete search history.

(56) References Cited

U.S. PATENT DOCUMENTS

| | | | | |
|---|---|---|---|---|
| 6,924,478 | B1 | 8/2005 | Zubarev et al. | |
| 7,586,089 | B2 * | 9/2009 | Hartmer | 250/282 |
| 8,563,921 | B2 | 10/2013 | Brown et al. | |
| 8,624,179 | B2 | 1/2014 | Chen et al. | |
| 2001/0052569 | A1 * | 12/2001 | Bateman et al. | 250/288 |
| 2005/0208550 | A1 * | 9/2005 | Pappin et al. | 435/6 |
| 2006/0249670 | A1 * | 11/2006 | Monroe et al. | 250/283 |
| 2008/0241955 | A1 * | 10/2008 | Purkayastha et al. | 436/173 |
| 2009/0008543 | A1 * | 1/2009 | Reinhold | 250/282 |
| 2011/0278449 | A1 * | 11/2011 | Boecker et al. | 250/282 |
| 2012/0129201 | A1 * | 5/2012 | Suckau et al. | 435/23 |
| 2014/0222348 | A1 * | 8/2014 | May et al. | 702/19 |

* cited by examiner

*Primary Examiner* — Bernard E Souw
(74) *Attorney, Agent, or Firm* — Diederiks & Whitelaw, PLC

(57) ABSTRACT

A method of mass spectrometry is disclosed comprising providing a mixture of different analyte ions and supplying electrons or reagent ions to said mixture so as to transfer charge to the analyte ions. The transfer of charge causes at least some of the analyte ions to dissociate and others of the analyte ions not to dissociate, but to form intermediate ions of altered charge state. These intermediate ions are then isolated from other ions and excited so as to dissociate into daughter ions. The intermediate ions and their daughter ions are analyzed and associated with each other so that the intermediate can be identified from their daughter ions. The analyte ions can then be identified from the intermediate ions, since they differ only in charge state. The disclosed method enables analyte ions to be associated with their fragment ions, and therefore identified, without having to isolate individual analyte ions prior to their interactions with the electrons or reagent ions.

23 Claims, 4 Drawing Sheets

MS/MS ANALYSIS USING ECD OR ETD FRAGMENTATION

CROSS-REFERENCE TO RELATED APPLICATION

This application is the National Stage of International Application No. PCT/GB2013/050894, filed 5 Apr. 2013, which claims priority from and the benefit of United Kingdom Patent Application No. 1206309.5 filed on 5 Apr. 2012 and United Kingdom patent application No. 1218517.9 filed 16 Oct. 2012. The entire contents of this application is incorporated herein by reference.

BACKGROUND OF THE PRESENT INVENTION

The present invention relates to a method of mass spectrometry wherein reagent ions or electrons are used to transfer charges to analyte ions or analyte molecules so as to cause them to dissociate into daughter ions. The daughter ions can be used to help identify the analyte. The present invention also relates to a mass spectrometer for performing this method.

It is known to use atmospheric pressure electron capture dissociation (AP-ECD) for dissociating ions. This involves reacting all of the ion species generated by an electro-spray ionisation (ESI) ion source with the photo-electrons from a UV lamp. For mixtures of analytes, this can result in complex fragment ion spectra, which include interference from photo-ionised solvent background peaks, dopant ions and their derivatives, un-reacted precursors, as well as mixtures of fragments and charge reduced species from different precursor ions. This complexity can be partially mitigated by using liquid chromatography so as to separate out the components being analysed in time and/or by using subtraction techniques to remove background noise from the spectra. However, assigning precursor ions to their fragment ions from the spectral data can still be challenging. Currently, AP-ECD sources have no means of selecting precursor ions and then associating fragment ions to their precursor ions. This is because in AP-ECD sources the fragmentation occurs upstream of the mass spectrometer and hence before precursor ions can be selected. The above problems limit the analytical utility and commercial acceptance of the AP-ECD technique.

Conventional electron capture dissociation (ECD) and electron transfer dissociation (ETD) have been used in MS/MS instruments so as to associate precursor ions with their fragment ions. Unlike the AP-ECD technique described above, conventional ECD and ETD MS/MS instruments use ion-electron reactions in the ultra low vacuum cell of a Fourier Transform Ion Cyclotron Resonance (FTICR) mass spectrometer or in the low pressure RF containment cell of a quadrupole ion trap or travelling wave ion guide respectively. In these conventional techniques a precursor ion is selected using the MS1 mode of the MS/MS system and is, subsequently subjected to ion-ion or ion-electron reactions. The resulting products include the signature c and z type fragment ions, but for many species an intermediate species is also produced that has not yet dissociated and that is held together by non-covalent interactions. These intermediate products are typically charge reduced precursor ions and are termed ‘ECnoD’ and ‘ETnoD’ ions, rather than ECD or ETD ions, since they have not dissociated. Fragmentation of the non-dissociated intermediate species can be assisted by additional ion activation so as to further improve the abundance of ECD and ETD c and z fragment ions.

It is desired to provide an improved method of mass spectrometry and an improved mass spectrometer.

SUMMARY OF THE PRESENT INVENTION

According to a first aspect of the present invention there is provided a method of mass spectrometry comprising;

(a) providing analyte molecules or analyte ions;

(b) supplying electrons or reagent ions to said analyte molecules or analyte ions so as to transfer charge from said reagent ions or electrons to said analyte molecules or ions, said transfer of charge causing at least some of said analyte molecules or analyte ions to dissociate and others of said analyte molecules or analyte ions not to dissociate but to form intermediate ions of altered charge;

(c) isolating at least some of said intermediate ions from other ions;

(d) exciting at least some of the isolated intermediate ions so as to cause them to dissociate into daughter ions; and (e) analysing at least some of said intermediate ions prior to step (d) and/or analysing at least some of said daughter ions.

As set out in the background of invention section above, when analyte ions are subjected to electron capture dissociation (ECD) or electron transfer dissociation (ETD) by conventional techniques, the resulting fragment ion spectra can be complex and so it may be difficult to associate particular fragment ions with the analyte ions from which they derived. The present invention recognises that some precursor ions remain substantially the same after being subjected to the ECD and ETD reactions, other than a change in charge state, and that these ions may be used to simplify the analysis of the spectra. The charge altered precursor ions are known as intermediate ions. As it is known that the intermediate ions remain substantially the same as their precursor ions, it is possible to isolate them from the other ions that are present after the ECD and ETD reactions have taken place. The isolated intermediate ions are then excited so that they dissociate into daughter ions and the daughter ions are analysed. This enables the daughter ions of the intermediate ions that are present in the ECD or ETD fragment spectra to be associated with the intermediate ions. As such, the present invention can be used to simplify ECD and ETD fragment spectra since it possible to assign fragment ions to intermediate ions, and therefore to analyte ions.

Furthermore, the technique of the present invention is advantageous in that it can be used in relatively high pressure ion sources or reaction regions, such as atmospheric pressure ion sources or regions. As described in the background of invention section above, it was conventionally considered necessary to perform precursor on selection prior to ECD reactions in order to subject known precursor ions to ECD reactions and hence directly associate precursor ions with their ECD daughter ions. Such precursor ion selection is typically required to be performed in a low pressure region arranged upstream of the ECD reaction cell. In contrast, the technique of the present invention enables ions to associated with their daughter ions without having to arrange a low pressure region upstream of an ECD or ETD reaction cell, because it is not required to select precursor ions prior to the ECD or ETD reactions.

According to the present invention, the intermediate ions may be isolated from all other ions during said step of isolating said intermediate ions from other ions. The intermediate ions may be isolated from all precursor analyte ions or molecules and from all ECD or ETD fragment ions.

Preferably, said step of analysing comprises analysing the intermediate ions and analysing the daughter ions that are derived from the analysed intermediate ions. Said step of analysing preferably comprises mass analysing the intermediate ions and/or daughter ions.

The steps of isolating and exciting the intermediate ions and analysing the daughter ions are preferably performed in a manner by which the analysed daughter ions are correlated to the intermediate ions from which they derived. The intermediate ions may therefore be identified from their daughter ions, for example, by searching a database that includes a list of intermediate ions and their daughter ions. The analyte ions or molecules may be identified from the identified intermediate ions as being the same ions, but having a different charge state. The analyte may then be identified from the analyte ions or the intermediate ions, for example, by searching a database that correlates analytes to their ions.

The electrons or reagent ions are preferably supplied to the analyte molecules or analyte ions in an atmospheric pressure ion source or in a reaction cell that is maintained at a pressure selected from the group of >0.1 mbar; >10 mbar; >100 mbar; or about 1 bar.

Preferably, the method comprises providing a mixture of different analyte molecules or analyte ions for interacting with the electrons or reagent ions. This is in contrast to mass selecting a particular precursor ion prior to reacting the ion with reagent ions or electrons so as to cause dissociation.

The electrons or reagent ions may cause the analyte molecules or analyte ions to dissociate via electron capture dissociation (ECD) or via electron transfer dissociation (ETD). The intermediate ions may be precursor ions or molecules that have been reduced in charge (i.e. have become more negative) due to interactions with the reagent ions or electrons. However, it is contemplated herein that the reagent ions could transfer a positive charge to the analyte so as to cause dissociation. In this event the intermediate ions may be precursor ions or molecules that have increased in charge (i.e. have become more positive) due to interactions with the reagent ions. Typically, the reagent species would be electrons or reagent anions and the analyte ions would be cations. However, it is also contemplated that the reagent ions may be reagent cations and the analyte ions may be analyte anions.

Preferably, the electrons or reagent ions are supplied to the analyte molecules or analyte ions in an ion source or reaction cell and the intermediate ions are selectively transmitted downstream from the ion source or reaction cell and subsequently excited and dissociated into said daughter ions. The intermediate ions are preferably mass selectively transmitted downstream. Different intermediate ions may be selectively transmitted downstream at different times to be excited and dissociated at different times.

Intermediate ions may be isolated by selectively transmitting them downstream and may then be excited to dissociate. If the intermediate ions are of known types then this may be performed by selectively transmitting the known ions and rejecting other ions, e.g., using a mass filter to selectively transmit ions of desired mass to charge ratio and to reject other ions. Alternatively, it may not be known which ions are the intermediate ions. In this event, the apparatus used to transmit ions downstream to the excitation cell may be scanned so that the apparatus transmits ions having progressively higher or lower mass to charge ratios as time progresses. This may be achieved, for example, by transmitting the ions downstream through a multipole rod set and varying a voltage applied to a multipole rod set. The intermediate ions would be transferred sequentially to the excitation device such that each intermediate ion could be dissociated and analysed such that a given intermediate ion can then be associated with its daughter ions.

Preferably, the method is able to identify which ions are intermediate ions. The method optionally comprises the steps of: providing the analyte ions; analysing the analyte ions without first exposing them to said electrons or reagent ions so as to generate a first signal; exposing the analyte ions to the electrons or reagent ions so that some of the analyte ions form the intermediate ions, and analysing the resulting ions so as to generate a second signal. The method may also comprise comparing the first and second signals so as to determine a difference between the signals, the difference having been caused by the generation of the intermediate ions and serving to identify a characteristic of the ions which are the intermediate ions, and performing the step of isolating at least some of the intermediate ions based on the characteristic determined by comparing said signals.

The first and second signals may be generated by mass analysing the ions and in this event the mass or mass to charge ratio of the intermediate ions is the characteristic determined by comparing said signals. In this method, the first and second signals may represent mass spectra. Alternatively, the first and second signals may be generated using an ion mobility separator and the ion mobility of the intermediate ions is determined by comparing the signals and is preferably used to isolate the intermediate ions.

Preferably, the method comprises mass analysing the analyte ions to generate the first signal and mass analysing said resulting ions to generate the second signal. The first and second signals may then be compared so as to determine if one or more ion peaks has changed in mass to charge ratio. The ions giving rise to these ion peaks that have shifted are therefore determined to be potential intermediate ions, which may then be isolated and dissociated. According to a specific example, the first signal is generated and a peak is observed with a mass to charge ratio of m/z=A and the isotopes are separated by ⅓ amu. This may indicate that the species has 3 protons. Alternatively, the charge could be due to a metal adduct such as sodium. For example, the charge could be due to 2 protons in the species and one sodium adduct; one proton in the species and two sodium adducts; or solely due to 3 sodium adducts. The second signal is generated and a peak is observed at m/z=3*A. This is likely to be the same species as observed in the first signal, except wherein two of the positive charges have been neutralised by electrons due to the step of supplying electrons or reagent ions to the analyte ions. Similarly, in the first signal there may be observed a peak at a mass to charge ratio of m/z=B and having isotopes separated by ½ amu. This may indicate that the species has 2 protons. In the second signal there is observed a peak at m/z=2*B. This is likely to be the same species as observed in the first signal, except wherein one of the protons has been neutralised by an electron due to the step of supplying electrons or reagent ions to the analyte ions. In these example, the peaks in the second signal at m/z=3*A and m/z=2*A are likely to have been observed due to the generation of intermediate products (i.e. precursor ions of altered charge state) and hence the ions corresponding to these peaks are candidates for isolation and excitation.

The intermediate ions may be isolated from the other ions using a mass filter to mass selectively transmit the intermediate ions. Preferably, the intermediate ions are isolated by setting an RF multipole rod set so as to transmit the intermediate ions and filter other ions. In a preferred embodiment the mass filter is a quadrupole rod set.

The intermediate products may be automatically selected for excitation and MS/MS analysis by a data system. In a preferred embodiment, intermediate ions are analysed in an MS mode. A computer may analyse the MS data and looks for mass to charge ratio peaks that correspond to intermediate ions. The computer may then select a transmission window for a mass filter so as to transmit only intermediate ions having mass to charge ratios corresponding to that of a peak that has been detected. These transmitted ions may then be excited to dissociate and the resulting daughter ions may be analysed. The precursor intermediate ions and the daughter ions are then known to be related. For example, in a mass spectrometer using chromatography, a quadrupole mass filter and a Time of Flight (TOF) mass analyser; as the sample elutes it generates signals on the TOF mass analyser in an MS mode, during which the quadrupole mass filter is fully transparent and passes all ions. The computer analyses the MS data and looks for mass to charge ratio peaks in real time. The computer may then select a transmission window for the quadrupole so as to transmit only mass to charge ratios corresponding to that of a peak that has been detected. These transmitted ions may then be excited so as to dissociate, e.g. via CID, and the resulting daughter ions are analysed. The precursor ions and fragment ions are then known to be related. It will be appreciated that such an automated system may be provided using an analyte source that is not a chromatography source. The mass filter may also be a filter other than a quadrupole filter. The mass analyser may also be a mass analyser other than a TOF mass analyser.

The intermediate ions are excited so as to dissociate and they may be excited by one or more of the following techniques: collision induced dissociation (CID); excitation by electromagnetic waves; excitation by Infra Red or Ultra Violet laser light or lamp radiation; surface induced dissociation (SID); electron transfer dissociation; and electron capture dissociation; or X-Rays. Other forms of excitation could be used.

The analyte ions or analyte molecules are preferably from biomolecules. The analyte ions or analyte molecules may contain disulphide linked biomolecules, which tend to be difficult to dissociate, for example, by CID and even by conventional ETD or ECD.

The electrons or reagent ions may be generated by any means. Where electrons are generated, they may be generated using any one of: photo-ionisation, such as a UV lamp; high voltage corona or glow discharges; or plasmas, such as low temperature plasmas.

From a second aspect, the present invention also provides a method of mass spectrometry comprising:

providing a mixture of different analyte molecules or analyte ions;

supplying electrons or reagent ions to said mixture of different analyte molecules or analyte ions so as to transfer charge from said reagent ions or electrons to said analyte molecules or ions, said transfer of charge causing at least some of said analyte, molecules or analyte ions to dissociate and others of said analyte molecules or analyte ions not to dissociate but to form intermediate ions of altered charge;

isolating at least some of said intermediate ions from other ions;

exciting at least some of the isolated intermediate ions so as to cause them to dissociate into daughter ions;

analysing at least some of the intermediate ions and at least some of their daughter ions so as to associate at least some of the intermediate ions with their daughter ions; and identifying intermediate ions from their daughter ions.

The method preferably further comprises using the identified intermediate ions to identify the analyte molecules or analyte ions from which these intermediate ions derived. For example, the mass spectrometer may be configured to search a data base that correlates intermediate ions to their analyte molecules or ions.

The method may have any one or any combination of any two or more of the preferred or optional features described above in relation to the first aspect of the present invention.

From a third aspect, the present invention provides a mass spectrometer comprising:

an ion source for receiving analyte molecules or analyte ions;

means for supplying electrons or reagent ions to said analyte molecules or analyte ions in said ions source so as to transfer charge from said reagent ions or electrons to said analyte molecules or ions, said transfer of charge causing at least some of said analyte molecules or analyte ions to dissociate and others of said analyte molecules or analyte ions not to dissociate but to form intermediate ions of altered charge;

means for isolating at least some of said intermediate ions from other ions;

means for exciting, at least some of the isolated intermediate ions so as to cause them to dissociate into daughter ions; and means for mass analysing at least some of said intermediate ions and/or mass analysing at least some of said daughter ions.

The mass spectrometer is preferably arranged and configured so as to perform any one or any combination of any two or more of the preferred or optional features described above in relation to the first aspect of the present invention.

According to a fourth aspect, the present invention also provides a mass spectrometer comprising:

an ion source or reaction cell for receiving a mixture of different analyte molecules or analyte ions;

means for supplying electrons or reagent ions to said mixture of different analyte molecules or analyte ions in said ion source or reaction cell so as to transfer charge from said reagent ions or electrons to said analyte molecules or ions, said transfer of charge for causing at least some of said analyte molecules or analyte ions to dissociate and others of said analyte molecules or analyte ions not to dissociate but to form intermediate ions of altered charge;

means for isolating at least some of said intermediate ions from other ions;

means for exciting at least some of the isolated intermediate ions so as to cause them to dissociate into daughter ions; and means for mass analysing at least some of the intermediate ions and at least some of their daughter ions, said means configured to associate at least some of the intermediate ions with their daughter ions; and means for identifying intermediate ions from their daughter ions.

The mass spectrometer preferably further comprising means for using the identified intermediate ions to identify the analyte molecules or analyte ions from which these intermediate ions derived. For example, the mass spectrometer may be configured to search a data base that correlates intermediate ions to their analyte molecules or ions.

The mass spectrometer is preferably arranged and configured so as to perform any one or any combination of any two or more of the preferred or optional features described above in relation to the first aspect of the present invention.

The mass spectrometer described above in relation to the third of fourth aspects of the present invention may further comprise:

(a) an on source selected from the group consisting of (i) an Electrospray ionisation ("ESI") ion source; (ii) an Atmospheric Pressure Photo ionisation ("APPI") ion source; (iii) an Atmospheric Pressure Chemical Ionisation ("APCI") on source; (iv) a Matrix Assisted Laser Desorption Ionisation ("MALDI") ion source; (v) a Laser Desorption ionisation ("LDI") ion source (vi) an Atmospheric. Pressure Ionisation ("API") on source; (vii) a Desorption Ionisation on Silicon ("DIOS") ion source; (viii) an Electron Impact ("EI") ion source; (ix) a Chemical Ionisation ("CI") ion source; (x) a Field Ionisation ("FI") on source; (xi) a Field Desorption ("FD") on source; (xii) an Inductively Coupled Plasma ("ICP") ion source; (xiii) a Fast Atom Bombardment ("FAB") ion source; (xiv) a Liquid Secondary Ion Mass Spectrometry ("LSIMS") ion source; (xv) a Desorption Electrospray Ionisation ("DESI") ion source; (xvi) a Nickel-63 radioactive ion source; (xvii) an Atmospheric Pressure Matrix Assisted Laser Desorption ionisation ion source; (xviii) a Thermospray on source; (xix) an Atmospheric Sampling Glow Discharge Ionisation ("ASGDI") on source; (xx) a Glow Discharge ("GD") on source; (xx) an Impactor on source; (xxii) a Direct Analysis in Real Time ("DART") ion source (xxiii) a Laserspray Ionisation ("LSI") on source; (xxiv) a Sonicspray Ionisation ("SSI") ion source; (xxv) a Matrix Assisted Inlet Ionisation ("MAII") ion source; and (xxvi) a Solvent Assisted Inlet Ionisation ("SAII") ion source; and/or (b) one or more continuous or pulsed ion sources; and/or (c) one or more ion guides; and/or (d) one or more ion mobility separation devices and/or one or more Field Asymmetric on Mobility Spectrometer devices; and/or (e) one or more ion traps or one or more ion trapping regions; and/or (f) one or more collision, fragmentation or reaction cells selected from the group consisting of: (i) a Collisional Induced Dissociation ("CID") fragmentation device; (ii) a Surface Induced Dissociation ("SID") fragmentation device; (iii) an Electron Transfer Dissociation ("ETD") fragmentation device; (iv) an Electron Capture Dissociation ("ECD") fragmentation device; (v) an Electron Collision or Impact Dissociation fragmentation device; (vi) a Photo Induced Dissociation ("PID") fragmentation device; (vii) a Laser Induced Dissociation fragmentation device; (viii) an infrared radiation induced dissociation device; (ix) an ultraviolet radiation induced dissociation device; (x) a nozzle-skimmer interface fragmentation device; (xi) an in-source fragmentation device; (xii) an in-source Collision Induced Dissociation fragmentation device; (xiii) a thermal or temperature source fragmentation device; (xiv) an electric field induced fragmentation device; (xv) a magnetic field induced fragmentation device; (xvi) an enzyme digestion or enzyme degradation fragmentation device; (xvii) an ion-ion reaction fragmentation device; (xviii) an ion-molecule reaction fragmentation device; (xix) an ion-atom reaction fragmentation device; (xx) an ion-metastable ion reaction fragmentation device; (xxi) an ion-metastable molecule reaction fragmentation device; (xxii) an ion-metastable atom reaction fragmentation device; (xxiii) an ion-ion reaction device for reacting ions to form adduct or product ions; (xxiv) an ion-molecule reaction device for reacting ions to form adduct or product ions; (xxv) an ion-atom reaction device for reacting ions to form adduct or product ions; (xxvi) an ion-metastable ion reaction device for reacting ions to form adduct or product ions; (xxvii) an ion-metastable molecule reaction device for reacting ions to form adduct or product ions; (xxviii) an ion-metastable atom reaction device for reacting ions to form adduct or product ions; and (xxix) an Electron Ionisation Dissociation ("EID") fragmentation device; and/or (g) a mass analyser selected from the group consisting of: (i) a quadrupole mass analyser; (ii) a 2D or linear quadrupole mass analyser; (iii) a Paul or 3D quadrupole mass analyser; (iv) a Penning trap mass analyser; (v) an ion trap mass analyser; (vi) a magnetic sector mass analyser; (vii) Ion Cyclotron Resonance ("ICR") mass analyser; (viii) a Fourier Transform Ion Cyclotron Resonance ("FTICR") mass analyser; (ix) an electrostatic or orbitrap mass analyser; (x) a Fourier Transform electrostatic or orbitrap mass analyser; (xi) a Fourier Transform mass analyser; (xii) a Time of Flight mass analyser; (xiii) an orthogonal acceleration Time of Flight mass analyser; and (xiv) a linear acceleration Time of Flight mass analyser; and/or (h) one or more energy analyzers or electrostatic energy analyzers; and/or (i) one or more ion detectors; and/or (j) one or more mass filters selected from the group consisting of: (i) a quadrupole mass filter; (ii) a 2D or linear quadrupole on trap; (iii) a Paul or 3D quadrupole ion trap; (iv) a Penning ion trap; (v) an ion trap; (vi) a magnetic sector mass filter; (vii) a Time of Flight mass filter; and (viii) a Wien filter; and/or (k) a device or ion gate for pulsing ions; and/or (l) a device for converting a substantially continuous ion beam into a pulsed ion beam.

The mass spectrometer may further comprise either:

(i) a C-trap and an orbitrap (RTM) mass analyser comprising an outer barrel-like electrode and a coaxial inner spindle-like electrode, wherein in a first mode of operation ions are transmitted to the C-trap and are then injected into the orbitrap (RTM) mass analyser and wherein in a second mode of operation ions are transmitted to the C-trap and then to a collision cell or Electron Transfer Dissociation device wherein at least some ions are fragmented into fragment ions, and wherein the fragment ions are then transmitted to the C-trap before being injected into the orbitrap (RTM) mass analyser; and/or (ii) a stacked ring on guide comprising a plurality of electrodes each having an aperture through which ions are transmitted in use and wherein the spacing of the electrodes increases along the length of the ion path, and wherein the apertures in the electrodes in an upstream section of the ion guide have a first diameter and wherein the apertures in the electrodes in a downstream section of the ion guide have a second diameter which is smaller than the first diameter, and wherein opposite phases of an AC or RF voltage are applied, in use, to successive electrodes.

According to an embodiment the mass spectrometer further comprises a device arranged and adapted to supply an AC or RF voltage to the electrodes. The AC or RF voltage preferably has an amplitude selected from the group consisting of; (i) <50 V peak to peak; (ii) 50-100 V peak to peak; (iii) 100-150 V peak to peak; (iv) 150-200 V peak to peak; (v) 200-250 V peak to peak; (vi) 250-300 V peak to peak; (vii) 300-350 V peak to peak; (viii) 350-400 V peak to peak; (ix) 400-450 V peak to peak; (x) 450-500 V peak to peak; and (xi) >500 V peak to peak.

The AC or RF voltage preferably has a frequency selected from the group consisting of (i) <100 kHz; (ii) 100-200 kHz; (A) 200-300 kHz; (iv) 300-400 kHz; (v) 400-500 kHz; (vi) 0.5-1.0 MHz; (vii) 1.0-1.5 MHz; (viii) 1.5-2.0 MHz; (ix) 2.0-2.5 MHz; (x) 2.5-3.0 MHz; (xi) 3.0-3.5 MHz; (xii) 3.5-4.0 MHz; (xiii) 4.0-4.5 MHz; (xiv) 4.5-5.0 MHz; (xv) 5.0-5.5 MHz; (xvi) 5.5-6.0 MHz; (xvii) 6.0-6.5 MHz; (xviii) 6.5-7.0 MHz; (xix) 7.0-7.5 MHz; (xx) 7.5-8.0 MHz; (xxi) 8.0-8.5 MHz; (xxii) 8.5-9.0 MHz; (xxiii) 9.0-9.5 MHz; (xxiv) 9.5-10.0 MHz: and (xxv) >10.0 MHz.

According to a preferred embodiment, analyte ions are subjected to ECD or ETD conditions by supplying electrons or reagent ions to the analyte ions. This process is preferably performed in an atmospheric pressure region, such as an AP-ECD source or an AP-ETD source. The ECD or ETD conditions cause some analyte ions to dissociate and other analyte ions to form non-dissociated intermediate ions. These intermediate ions are the same as the analyte ions from which they derived, except that the ECD or ETD conditions have reduced the charge states of the analyte ions to form the intermediate ions. These intermediate ions are known as ECnoD or ETnoD product ions. The intermediate ions are then isolated, for example, by mass to charge ratio via the use of a mass filter. By way of example, such mass filtering may be performed by passing the ions though a multipole rod set and applying voltages to the multipole rod set so as to selectively transmit only ions of the desired mass to charge ratios. At least some of the intermediate ions may then be mass analyzed. Alternatively, their identities may already be known and they may not be required to be mass analysed, for example, because the analyte ions were known and the intermediate ions are simply charge altered analyte ions; or because the method of isolating the intermediate ions determines their mass to charge ratios (e.g. mass filtering). After the intermediate ions have been isolated, they are subjected to supplemental activation so as to cause them to fragment into daughter ions. Collision induced dissociation (CID) may be used in order to fragment the intermediate ions. The daughter ions may then be mass analysed and are preferably associated with their parent intermediate ions.

Preferably, the quadrupole rod set of a quadrupole-Time of Flight mass spectrometer is used to select charge reduced ECnoD or ETnoD intermediate ions for supplemental activation. As such, MS/MS analysis can be achieved even though the ion-electron ECD reactions or the ion-ion ETD reactions occurred prior to the selection of the intermediate ions.

The preferred embodiment differs substantially from conventional ECD and ETD MS/MS techniques because it is based on the realisation that intermediate products can be used to associate precursor ions and their daughter ions, even after ECD and ETD reactions have already occurred. In conventional ECD and ETD techniques, precursor ions must be selected prior to the electron capture or electron transfer event so that it is known which precursor ions lead to which daughter ions. These conventional techniques require that the precursor ion selection and the ECD or ETD reactions occur under vacuum conditions. In contrast, according to the preferred method of the present invention, the analyte can be exposed to ECD and ETD reactions before any ion selection needs take place. As such, the ECD and ETD technique can be used in high pressure sources. The present invention is therefore significantly simplified relative to existing vacuum ECD and ETD systems, which involve significantly more complex and expensive instrumentation.

BRIEF DESCRIPTION OF THE DRAWINGS

Various embodiments of the present invention will now be described, by way of example only, and with reference to the accompanying drawings in which:

FIG. 2A shows a mass spectrum obtained from a sample that has been subjected to conventional ETD in a vacuum, whereas

DETAILED DESCRIPTION OF THE PREFERRED EMBODIMENTS

Figure 1A:
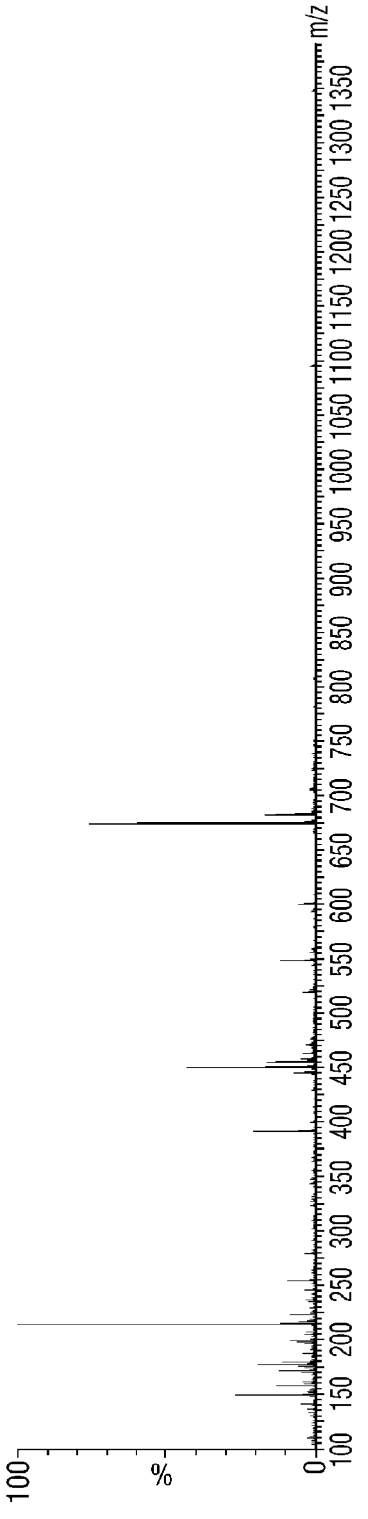
FIG. 1A shows an MS mass spectrum obtained from a sample using a conventional technique.
Figure 1B:
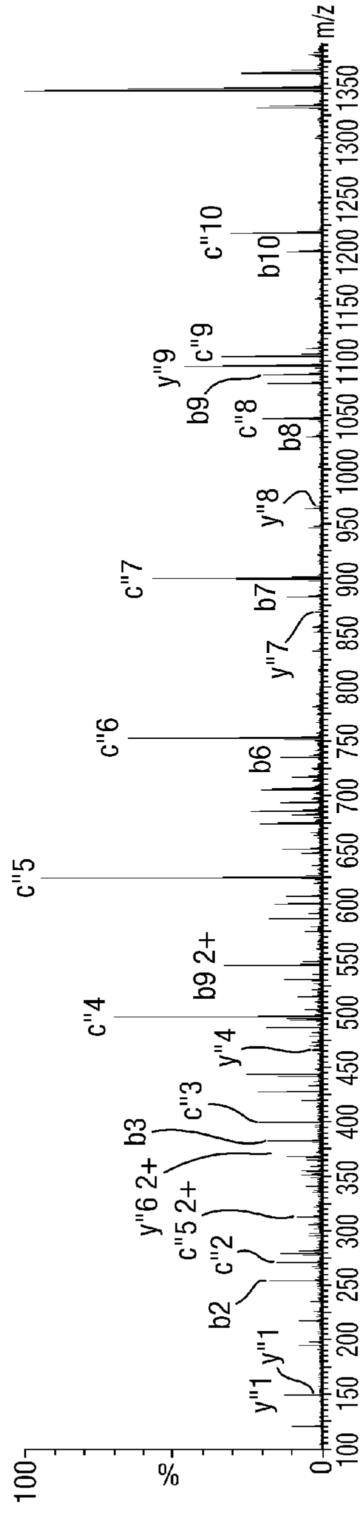
FIG. 1B shows a mass spectrum obtained when the sample analysed in FIG. 1A is subjected to AP-ECD and then analysed.

FIG. 1A shows a mass spectrum obtained by mass analysing a sample (substance P) using a conventional technique so as to obtain MS data. FIG. 1B shows a mass spectrum obtained by subjecting the same sample to conventional AP-ECD and then mass analysing the resulting ions. The ECD conditions were provided by using a UV lamp to generate photo-electrons and allowing the photo-electrons to interact with, the sample ions so as to achieve ECD.

As can be seen by comparing the two spectra of FIGS. 1A and 1B, the AP-ECD process causes parent ions shown in FIG. 1A to fragment into daughter ions shown in FIG. 1B. In this example, the sample being analysed is known (substance-P) and it is possible to identify some of the daughter ions peaks. However, the spectrum of FIG. 1B includes many other peaks of unknown origin and it is not possible to know directly from the experiment which peaks are due to parent ions or fragment ions. It will be appreciated that if the sample being analysed contained mixtures of unknown substances then the data would be even more complex and even more difficult to identify parent and daughter ion peaks.

Figure 2A:

FIG. 2A shows a mass spectrum obtained by subjecting a sample to conventional ETD fragmentation in a traveling wave ion guide of a quadrupole Time of Flight mass analyser (QTOF) at a pressure of 0.05 mBar and then mass analysing the resulting ions. According to this conventional technique, a precursor ion is selected using the quadrupole rod set of the QTOF. The precursor ion is then subjected to ETD fragmentation under vacuum conditions so as to dissociate the precursor ions. The resulting ions were then mass analysed in the Time of Flight mass analyser so as to obtain the spectrum shown in FIG. 2A. The nature of this conventional technique ensures that the precursor ions and their daughter ions are able to be directly correlated to each other since each precursor ion is selected and then fragmented to produce its daughter ions. However, this technique is not able to associate parent and daughter ions if the parent ions have already been subjected to the ETD or ECD conditions present in the ion source or upstream of the precursor ion selection.

Figure 2B:
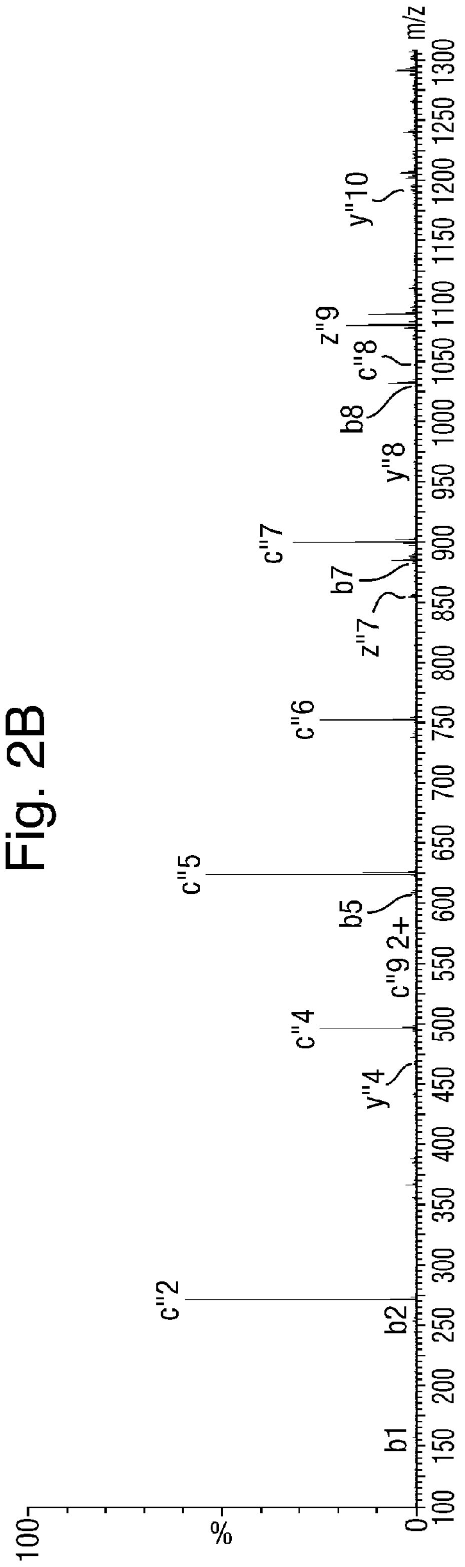
FIG. 2B shows a mass spectrum obtained by a technique according to a preferred embodiment of the present invention.

FIG. 2B shows a mass spectrum obtained by mass analysing a sample comprising substance-P in accordance with a preferred embodiment of the present invention. In this embodiment a mixture of precursor ions was subjected to ECD fragmentation at atmospheric pressure using a UV lamp to generate the reagent electrons. The resulting ions were then mass analysed to obtain spectral data. When precursor ions are subjected to ECD reaction conditions many of the precursor ions dissociate into fragment ions, but some of the precursor ions may not dissociate and may simply change charge state so as to form intermediate ions known as ECnoD ions. In this technique ECnoD intermediate ions were identified and then isolated from the other ions by being mass selectively transmitted through a quadrupole rod set whilst rejecting other ions. These intermediate ions were then subjected to mild CID conditions so as to induce the intermediate ions to dissociate into fragment ions. The fragment ions were then mass analysed. The spectral data obtained from this technique is shown in FIG. 2B.

In the preferred embodiment, identification of the ECnoD ions was performed by searching for precursor ion mass peaks in a mass spectrum that were shifted in mass to charge ratio due to a change in their charge state. In this example, a sample containing substance-P was ionised and then mass analysed to produce first mass spectral data (shown in FIG. 1A). The triply protonated cation of substance-P was observed at a mass to charge ratio of 450 and the doubly protonated cation of substance-P was also observed in the first mass spectral data at a mass to charge ratio of 674. The parent ions were then subjected to ECD conditions at atmospheric pressure and mass spectral data was obtained (FIG. 1B). This was achieved by using a UV lamp to generate reagent electrons and allowing these electrons to interact with the parent ions. Subjecting the parent ions to ECD conditions resulted in the production of intermediate ECnoD ions, i.e. non-dissociated parent ions of reduced charge. The ions resulting from the ECD conditions were then mass analyzed to produce second mass spectral data. It was then possible to identify intermediate ECnoD ions by recognising that the triply and/or doubly protonated cations of substance-P that were observed in the first mass spectral data had been charge reduced by the ECD conditions such that the singly charged species of substance-P (having one or two electron-neutralized protons) were observed at mass to charge ratios of 1348 and 1349 in the second mass spectral data. The intermediate ions were therefore identified as having mass to charge ratios of 1348 and 1349. Once these intermediate ECnoD ions had been identified they were then isolated by transmitting the ions through a quadrupole rod set that was set to selectively transmit only these intermediate ions. Once these intermediate ions had been isolated they were then subjected to Collisionally Induced Dissociation ("CID") so as to dissociate the intermediate ions into daughter ions. These daughter ions were then mass analysed so as to produce the mass spectrum shown in FIG. 2B.

A comparison of FIGS. 2A and 2B shows that the daughter ions generated by the preferred embodiment shown in FIG. 2B are of similar nature to those shown in FIG. 2A. In other words, the two techniques generate similar c and/or z ions, showing that the preferred embodiment may be used to reliably identify precursor or parent ions from the daughter ions.

It is to be noted that the collision energy required to promote the supplemental excitation of the intermediate ions so as to dissociate into daughter ions is significantly lower in the preferred embodiment than that which would be normally required for conventional CID fragmentation. In fact the collision energy can be set low enough to reduce the inclusion of conventional CD fragment ions. Despite this, for some samples, y-ions may be generated. It is not known whether the y-ions, which are traditionally associated with CID fragmentation, are in fact derived from the ECD process.

Figure 3:
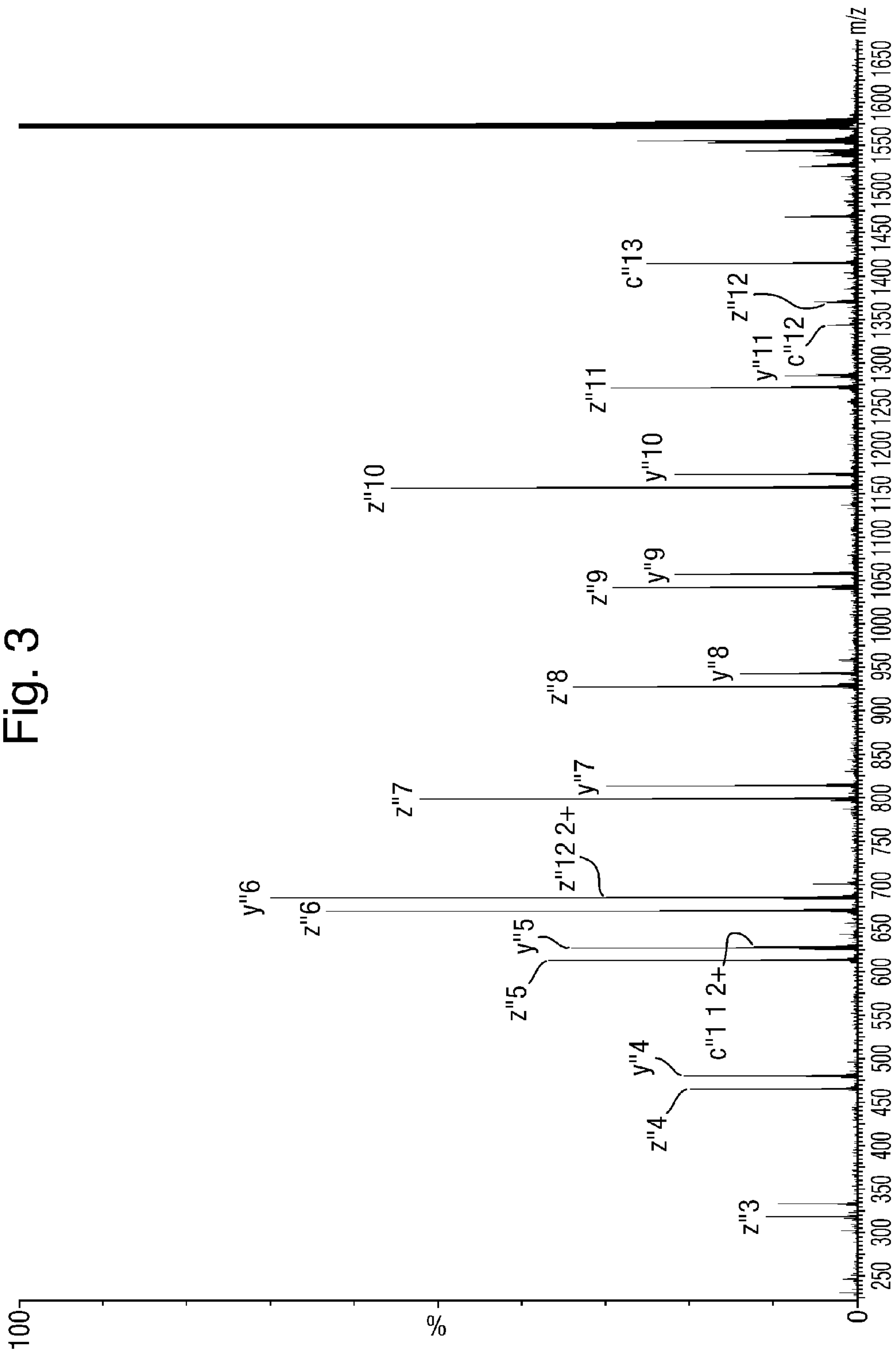
FIG. 3 shows a mass spectrum obtained by mass analysing a sample comprising glufibrinopeptide in accordance with a preferred embodiment of the present invention.

FIG. 3 shows a mass spectrum obtained by mass analysing a sample comprising glufibrinopeptide in accordance with a preferred embodiment of the present invention. A sample containing glufibrinopeptide was ionised and then mass analysed to produce first mass spectral data. A mixture of 2+ and 3+ ions (and other ions) was detected in the first mass spectral data. The parent ions were then subjected to ECD conditions at atmospheric pressure. Subjecting the parent ions to ECD conditions resulted in the production of intermediate ECnoD ions, i.e. non-dissociated parent ions of reduced charge. The ions resulting from the ECD conditions were then mass analyzed to produce second mass spectral data. It was then possible to identify intermediate ECnoD ions by recognising that the triply and doubly protonated cations that were observed in the first mass spectral data had been charge reduced by the ECD conditions such that the signal of the singly charged cation (having one or two electron-neutralized protons) had significantly increased in the second mass spectral data. The intermediate ions were therefore identified as the ions providing the increased signal in the second mass spectral data. Once these intermediate ECnoD ions had been identified they were then isolated by transmitting the ions through a quadrupole rod set that was set to selectively transmit only these intermediate ions. Once these intermediate ions had been isolated they were then subjected to Collisionally Induced Dissociation ("CID") so as to dissociate the intermediate ions into daughter ions. These daughter ions were then mass analysed so as to produce the mass spectrum shown in FIG. 3, showing the z ions.

Figure 4:
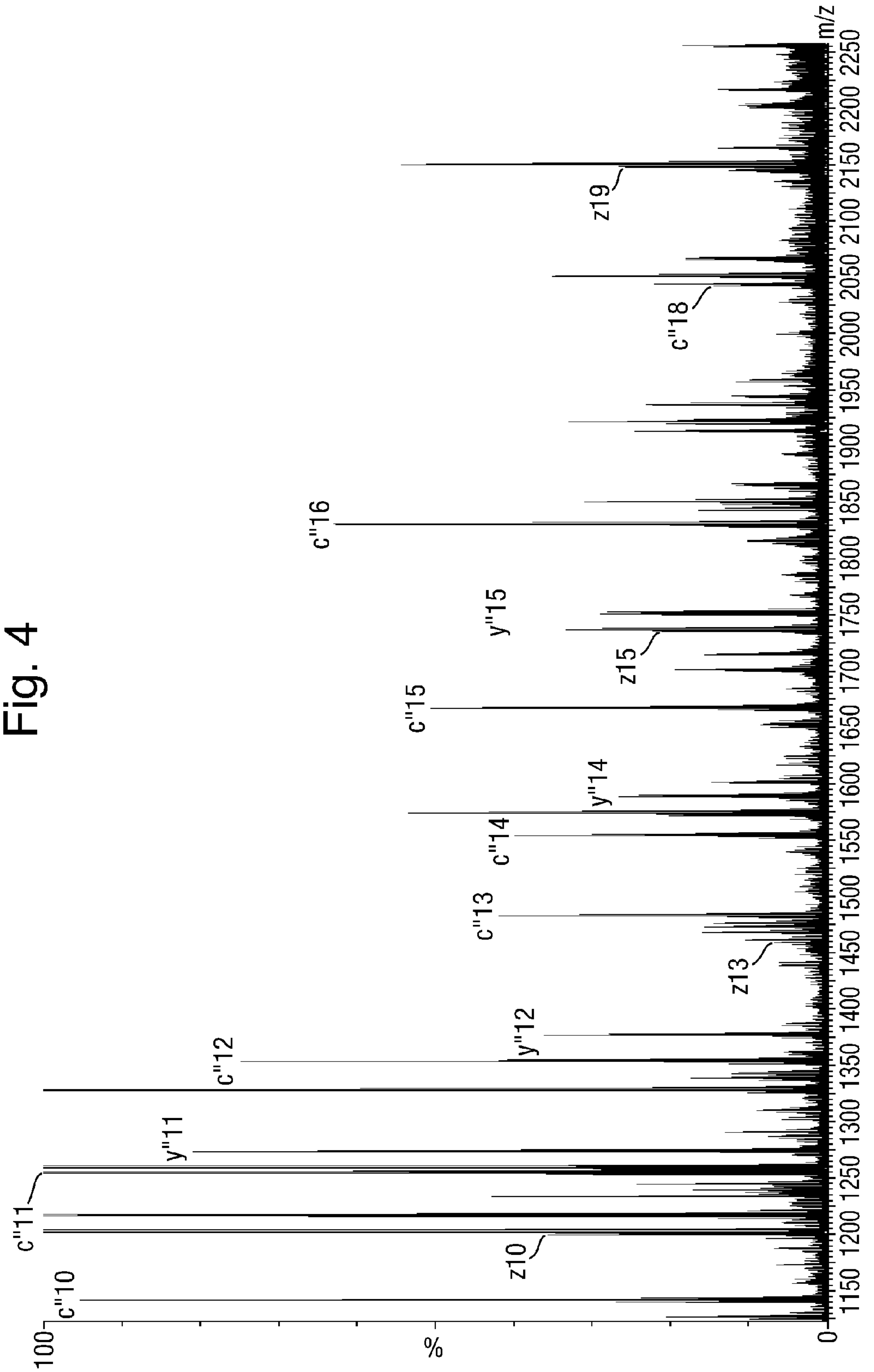
FIG. 4 shows a mass spectrum obtained by mass analysing a sample comprising bovine insulin in accordance with a preferred embodiment of the present invention.

FIG. 4 shows a mass spectrum obtained by mass analysing a sample comprising bovine insulin (molecular weight 5730) in accordance with a preferred embodiment of the present invention. The sample was analysed in substantially the same manner as described above with respect to FIGS. 2B and 3. The precursor ions were subjected to ECD conditions at atmospheric pressure, resulting in precursor ions being charge reduced to 2+ so as to form intermediate ECnoD ions. The 2+ intermediate ECnoD ions were then selected by a quadrupole rod set for excitation and fragmentation by CID fragmentation. This technique resulted in high sequence coverage including N and C terminal fragmentation of the beta chain of the bovine insulin. The resulting daughter ion spectrum is shown in FIG. 4. It is important to note that the alpha and beta chains are doubly linked by disulfide bonds that are conventionally very difficult to fragment, even by conventional vacuum ECD or ETD. The preferred embodiment therefore provides an improved method for fragmenting these types of bonds.

Although the present invention has been described with reference to preferred embodiments, it will be understood by those skilled in the art that various changes in form and detail may be made without departing from the scope of the invention as set forth in the accompanying claims.

The invention claimed is:

1. A method of mass spectrometry comprising:

(a) providing a mixture of different analyte molecules or analyte ions;

(b) supplying electrons or reagent ions to said mixture of different analyte molecules or analyte ions so as to transfer charge from said reagent ions or electrons to said analyte molecules or ions, said transfer of charge causing at least some of said analyte molecules or analyte ions to dissociate and others of said analyte molecules or analyte ions not to dissociate but to form intermediate ions of altered charge;

(c) isolating at least some of said intermediate ions from other ions;

(d) exciting at least some of the isolated intermediate ions so as to cause them to dissociate into daughter ions; and (e) mass analysing at least some of said intermediate ions and/or or mass analysing at least some of said daughter ions.

2. The method of claim 1, wherein the electrons or reagent ions are supplied to the analyte molecules or analyte ions in an atmospheric pressure ion source or in an ion source or reaction cell that is maintained at a pressure selected from the group of >0.1 mbar; >10 mbar; >100 mbar; or about 1 bar.

3. The method of claim 1, wherein the electrons or reagent ions cause said analyte molecules or analyte ions to dissociate via electron capture dissociation (ECD) or via electron transfer dissociation (ETD).

4. The method of claim 1, wherein the intermediate ions are precursor analyte ions that have been reduced in charge due to interactions with said reagent ions or electrons.

5. The method of claim 1, wherein the electrons or reagent ions are supplied to the analyte molecules or analyte ions in an ion source or reaction cell and wherein the intermediate ions are selectively transmitted downstream of the ion source or reaction cell and subsequently excited and dissociated into said daughter ions.

6. The method of claim 1, comprising:

providing said analyte ions;

analysing said analyte ions without first exposing them to said electrons or reagent ions so as to generate a first signal;

exposing said analyte ions to said electrons or reagent ions so that some of said analyte ions form said intermediate ions, and mass analysing the resulting ions so as to generate a second signal;

comparing the first and second signals so as to determine a difference between the signals, the difference having been caused by the generation of said intermediate ions and serving to identify a characteristic of the ions which are the intermediate ions; and performing said step of isolating at least some of said intermediate ions based on said characteristic determined by comparing said signals.

7. The method of claim 6, wherein the first and second signals are generated by mass analysing the ions and the mass or mass to charge ratio of the intermediate ions is the characteristic determined by comparing said signals.

8. The method of claim 6, comprising mass analysing the analyte ions to generate the first signal and mass analysing said resulting ions to generate the second signal; comparing the first and second signals so as to determine if one or more ion peaks present in both signals has shifted in mass to charge ratio between the signals; and determining that the ions which give rise to the one or more shifted peaks are intermediate ions.

9. The method of claim 1, wherein the intermediate ions are isolated from the other ions using a mass filter to mass selectively transmit said intermediate ions.

10. The method of claim 9, wherein the intermediate ions are isolated by setting an RF rod set so as to transmit said intermediate ions and filter other ions.

11. The method of claim 6, wherein the first and second signals are generated using an ion mobility separator and the ion mobility of the intermediate ions is determined by comparing said signals and preferably used to isolate the intermediate ions.

12. The method of claim 1, wherein both the intermediate ions and their daughter ions are analysed in a manner so as to associate the intermediate ions with their daughter ions.

13. The method of claim 12, wherein at least some of the intermediate ions that have been dissociated to form daughter ions are identified from their daughter ions.

14. The method of claim 13, wherein the identified intermediate ions are used to identify the analyte molecules or analyte ions from which these intermediate ions derived.

15. The method of claim 1, wherein the intermediate ions are excited so as to dissociate by one or more of the following techniques: collision induced dissociation (CID); excitation by electromagnetic waves; excitation by X-rays; excitation by Infra Red or Ultra Violet waves; surface induced dissociation (SID); electron transfer dissociation; and electron capture dissociation.

16. The method of claim 1, wherein the analyte ions or analyte molecules are from biomolecules.

17. The method of claim 16, wherein the analyte ions or analyte molecules contain disulphide linked biomolecules.

18. The method of claim 1, wherein said electrons are generated by using any one of: photo-ionisation; high voltage corona or glow discharges; or plasmas.

19. A method of mass spectrometry comprising:

providing a mixture of different analyte molecules or analyte ions;

supplying electrons or reagent ions to said mixture of different analyte molecules or analyte ions so as to transfer charge from said reagent ions or electrons to said analyte molecules or ions, said transfer of charge causing at least some of said analyte molecules or analyte ions to dissociate and others of said analyte molecules or analyte ions not to dissociate but to form intermediate ions of altered charge;

isolating at least some of said intermediate ions from other ions;

exciting at least some of the isolated intermediate ions so as to cause them to dissociate into daughter ions;

analysing at least some of the intermediate ions and at least some of their daughter ions so as to associate at least some of the intermediate ions with their daughter ions; and identifying intermediate ions from their daughter ions.

20. The method of claim 19, further comprising using the identified intermediate ions to identify the analyte molecules or analyte ions from which these intermediate ions derived.

21. A mass spectrometer comprising:

an ion source or reaction cell for receiving a mixture of different analyte molecules or analyte ions;

means for supplying electrons or reagent ions to said mixture of different analyte molecules or analyte ions in said ion source or reaction cell so as to transfer charge from said reagent ions or electrons to said analyte molecules or ions, said transfer of charge for causing at least some of said analyte molecules or analyte ions to dissociate and others of said analyte molecules or analyte ions not to dissociate but to form intermediate ions of altered charge;

means for isolating at least some of said intermediate ions from other ions;

means for exciting at least some of the isolated intermediate ions so as to cause them to dissociate into daughter ions; and means for mass analysing at least some of said intermediate ions and/or or mass analysing at least some of said daughter ions.

22. A mass spectrometer comprising:

an ion source or reaction cell for receiving a mixture of different analyte molecules or analyte ions;

means for supplying electrons or reagent ions to said mixture of different analyte molecules or analyte ions in said ion source or reaction cell so as to transfer charge from said reagent ions or electrons to said analyte molecules or ions, said transfer of charge for causing at least some of said analyte molecules or analyte ions to dissociate and others of said analyte molecules or analyte ions not to dissociate but to form intermediate ions of altered charge;

means for isolating at least some of said intermediate ions from other ions;

means for exciting at least some of the isolated intermediate ions so as to cause them to dissociate into daughter ions; and means for analysing at least some of the intermediate ions and at least some of their daughter ions, said means configured to associate at least some of the intermediate ions with their daughter ions; and means for identifying intermediate ions from their daughter ions.

23. The mass spectrometer of claim 22, further comprising means for using the identified intermediate ions to identify the analyte molecules or analyte ions from which these intermediate ions derived.

* * * * *